(12) United States Patent
Gupta et al.

(10) Patent No.: US 11,475,022 B2
(45) Date of Patent: Oct. 18, 2022

(54) SYSTEM AND METHOD FOR CONSTRUCTING A COMPOUND OBJECT IN A DISTRIBUTED OBJECT STORAGE SYSTEM

(71) Applicant: Nutanix, Inc., San Jose, CA (US)

(72) Inventors: Karan Gupta, San Jose, CA (US); Manosiz Bhattacharyya, San Jose, CA (US); Rajkumar Arunkumar Joshi, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/852,335

(22) Filed: Apr. 17, 2020

(65) Prior Publication Data

US 2021/0141789 A1 May 13, 2021

Related U.S. Application Data

(60) Provisional application No. 62/934,935, filed on Nov. 13, 2019.

(51) Int. Cl.
G06F 16/00 (2019.01)
G06F 16/2458 (2019.01)
G06F 16/2457 (2019.01)
G06F 16/28 (2019.01)

(52) U.S. Cl.
CPC .... G06F 16/2458 (2019.01); G06F 16/24573 (2019.01); G06F 16/289 (2019.01)

(58) Field of Classification Search
CPC .......... G06F 16/2458; G06F 16/24573; G06F 16/289

USPC ........................................................ 707/769
See application file for complete search history.

(56) References Cited

U.S. PATENT DOCUMENTS

| 8,504,535 | B1* | 8/2013 | He | G06F 16/9574 |
|---|---|---|---|---|
| | | | | 707/999.003 |
| 8,549,518 | B1 | 10/2013 | Aron et al. | |
| 8,850,130 | B1 | 9/2014 | Aron et al. | |
| 9,779,035 | B1* | 10/2017 | Patiejunas | G06F 13/00 |
| 10,853,148 | B1* | 12/2020 | Kenney | G06F 9/4881 |
| 2016/0162320 | A1* | 6/2016 | Singh | G06F 9/5005 |
| | | | | 718/1 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Vincent F Boccio
(74) *Attorney, Agent, or Firm* — Foley & Lardner LLP

(57) ABSTRACT

An illustrated embodiment disclosed herein relates to a hyper converged infrastructure (HCI) having an object storage system (OSS) with an apparatus having a processor with programmed instructions that when executed cause the processor to perform operations. The operations include specifying a first object in the OSS as an executable, specifying a second object in the OSS as an environment on which to run the first object, specifying a third object in the OSS as data to be processed by the first object, and constructing and storing a composite object in the OSS that associates the first, second, and third objects. The composite object provides a technical improvement, providing more direct access to compute resources.

24 Claims, 10 Drawing Sheets

(56) References Cited

U.S. PATENT DOCUMENTS

2017/0083588 A1* 3/2017 Lang ................... G06F 16/2471
2019/0347127 A1* 11/2019 Coady ................. G06F 11/3442
2020/0257515 A1* 8/2020 Totale ....................... G06F 8/71
2021/0064262 A1* 3/2021 Myers ................... G06F 3/0647

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).

* cited by examiner

SYSTEM AND METHOD FOR CONSTRUCTING A COMPOUND OBJECT IN A DISTRIBUTED OBJECT STORAGE SYSTEM

CROSS-REFERENCE TO RELATED APPLICATION

This application is related to and claims priority under 35 U.S. § 119(e) from U.S. Provisional Application No. 62/934,935, filed Nov. 13, 2019, titled "SYSTEM AND METHOD FOR EXECUTABLE OBJECTS IN DISTRIBUTED OBJECT STORAGE SYSTEM," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for executable objects in a distributed object storage system.

An illustrated embodiment disclosed herein is an apparatus including a processor having programmed instructions to specify a first object as an executable, specify a second object as an environment on which to run the first object, specify a third object as data to be processed by the first object, and construct a composite object that associates the first, second, and third objects.

Another illustrated embodiment disclosed herein is a non-transitory computer readable storage medium having instructions stored thereon that, upon execution by a processor, causes the processor to perform operations including specifying a first object as an executable, specifying a second object as an environment on which to run the first object, specifying a third object as data to be processed by the first object, and constructing a composite object that associates the first, second, and third objects.

Another illustrated embodiment disclosed herein is a computer-implemented method including specifying, by a processor, a first object as an executable, specifying, by the processor, a second object as an environment on which to run the first object, specifying, by the processor, a third object as data to be processed by the first object, and constructing, by the processor, a composite object that associates the first, second, and third objects.

Further details of aspects, objects, and advantages of the invention are described below in the detailed description, drawings, and claims. Both the foregoing general description and the following detailed description are exemplary and explanatory and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
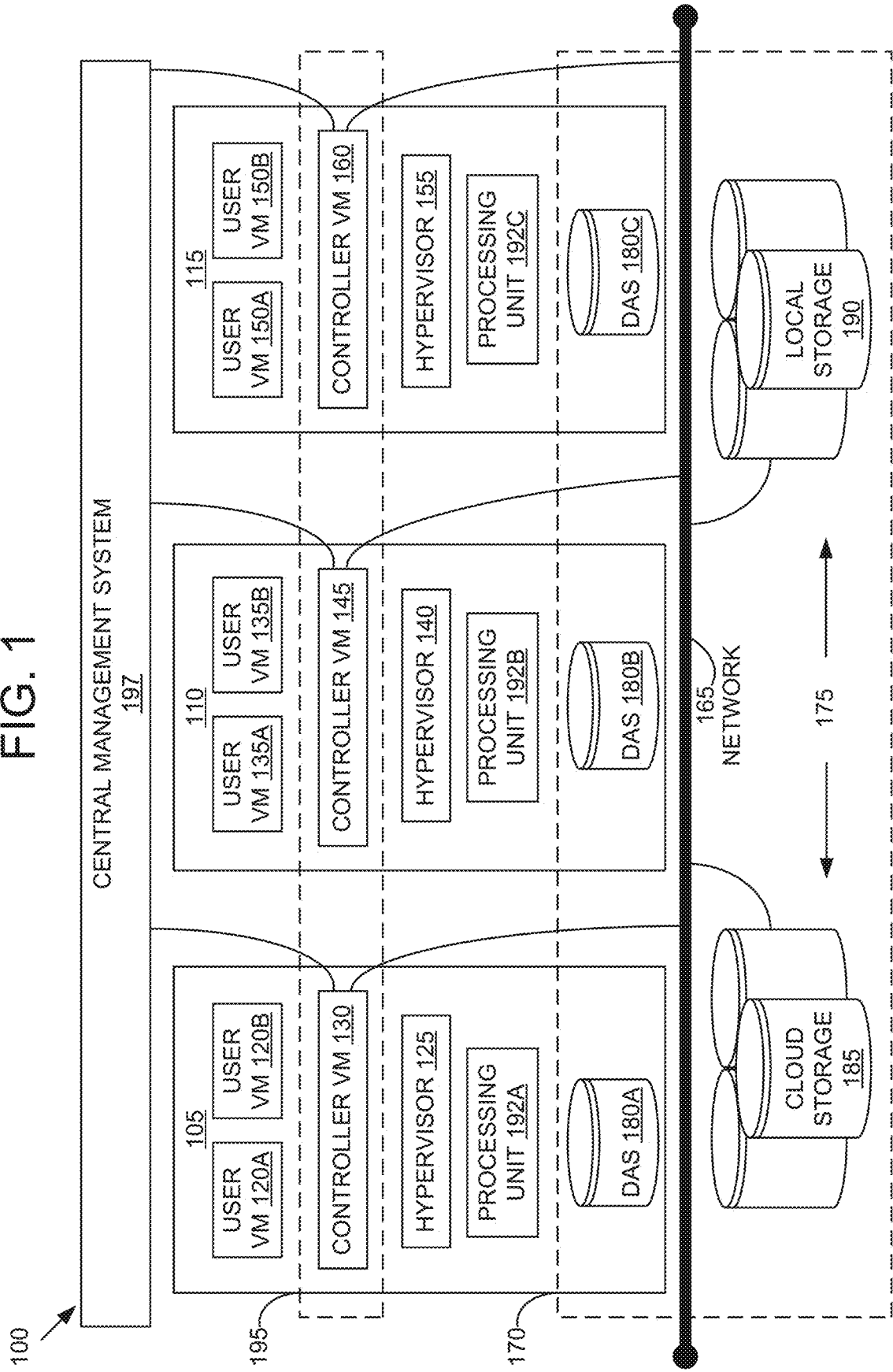
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Current serverless compute solutions allow processing of data stored in object storage systems. The serverless compute solution is appropriate for the cloud, where compute nodes and object stores are two separate constructs. However, for a user or an application analyzing or processing data, tying data to a separate compute construct results in unnecessary network hops, latency, and complexity. Thus, a technical problem is to implement a single-construct object storage system, and associated, method for analyzing or processing data.

In current hyper converged infrastructure (HCI) solutions, processing of data is triggered by a user or application, data is retrieved from locally hosted drives, and compute resources are sought on which to process the data. As users and jobs grow in size and fight for the same resources, the queue for scheduling resources grows and the data ping pongs between various resources, costing latency and nulling out any advantage of HCI. Moreover, the data is aggregated before tying the data to a compute resource. The extra aggregation step results in extra network hops and added latency.

Some embodiments of the present disclosure include a technical solution to the technical problem. Some embodiments of the present disclosure tag or specify objects as executable. Some embodiments specify data, executable and executable-infra objects during application programming interface, i.e., API, operations (e.g., PUT, GET, and DELETE operations), construct ephemeral/permanent composite objects that ties the data, executable and executable-infra objects, and run such composite objects automatically on available resources.

Some embodiments of the present disclosure simplify an interface for a user. Instead of having to manage compute constructs and storage constructs, the user only needs to store and identify data. Some embodiments of the present disclosure include the benefit of layering data and executables without having to use a queue for separately for such layering, providing a more direct access to compute resources. Moreover, some embodiments of the present disclosure allow an object to be processed without aggregation. Some embodiments of the present disclosure reduce the network hops, latency, and complexity in processing and analyzing data.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfill the input/output request (and/or request another component within the virtual computing system 100 to fulfill that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Executable Objects in Distributed Object Storage System

An object store is a collection of buckets. A bucket is a virtual representation of, and is created on (e.g., on top of), a virtual disk (e.g., a virtual disk configured for user VMs 120 in FIG. 1), or other data store. A bucket is like a folder except that the hierarchy of a bucket is flat, whereas a folder can have sub-folders. Objects are stored in the virtual disk backing the bucket. An object can be anything: a file, a document, a spreadsheet, a video, a data, metadata, etc. When buckets are created and objects are added, they are both given endpoints through which the user VMs 120, or external users or applications interfacing with the user VMs 120, can access them. Examples of endpoints are uniform resource locators (URLs).

Figure 2:
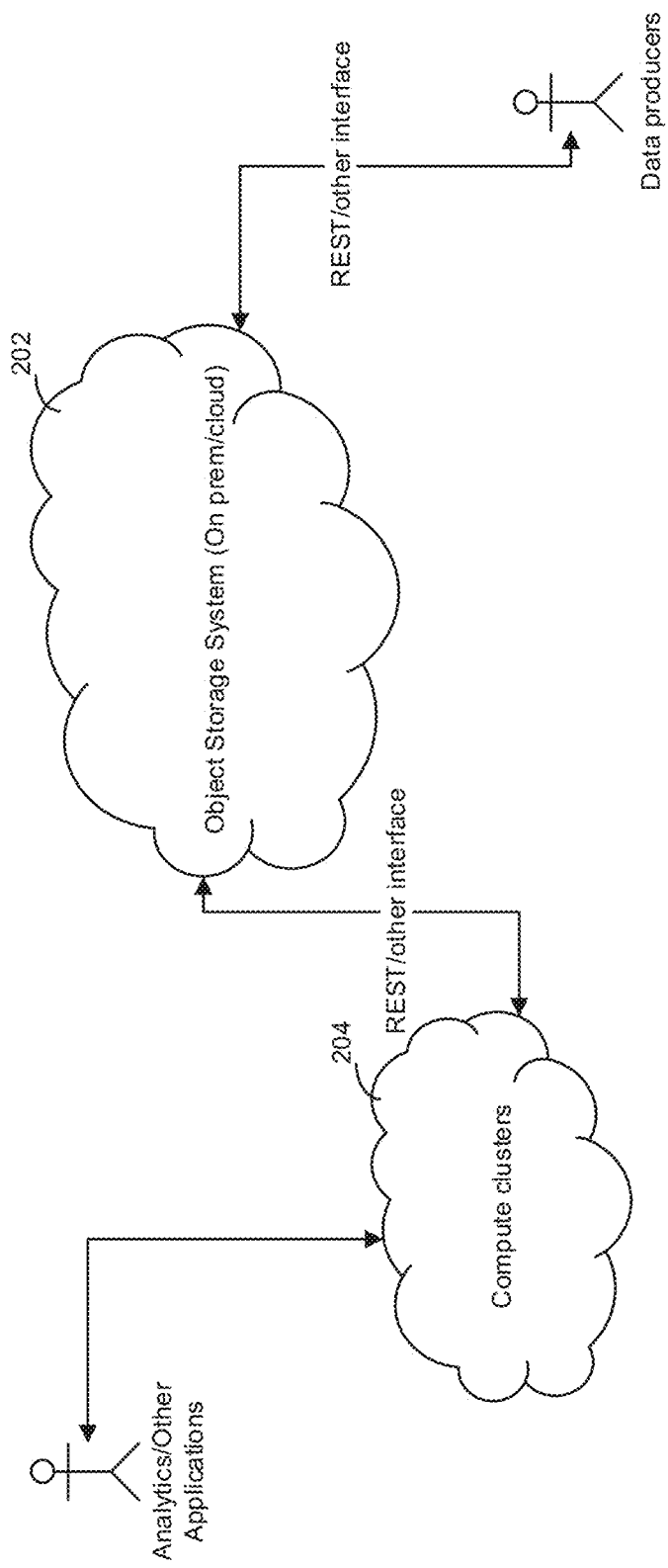
FIG. 2 illustrates a traditional object store system, in accordance with some embodiments of the present disclosure.

FIG. 2 illustrates a traditional object store system 202, in accordance with some embodiments of the present disclosure. The object storage systems 202 today are construed mainly as data storage solution. Processing of the objects is then done at later point in time. Processing includes reduction (compression, deduplication, etc.), encryption and erasure coding. The transformation is set by storage policies and the compute nodes (e.g., the compute cluster 204) for such processing is budgeted for and provided by the storage solution. The data that is ingested by the object store system 202 uses REST or some custom interface in C++, Java, Go, Python or some other interface. The Object store 202 itself is generally distributed system in single or multiple racks, within single or multiple data centers, spread across multiple geographical sites or regions. Within the object store 202 different media is used, like SSD, HDD or tapes (cost tiers). The data is read back from same or different applications for various processing. The data is pulled out of (e.g., pulled out of, read from, copied from, etc.) the object storage system and pulled into (e.g., pulled into, written to, copied to, stored in/on, etc.) the computer clusters 204 and after processing the data can be moved into different storage domain or back in to the same or different object storage system.

Figure 3:
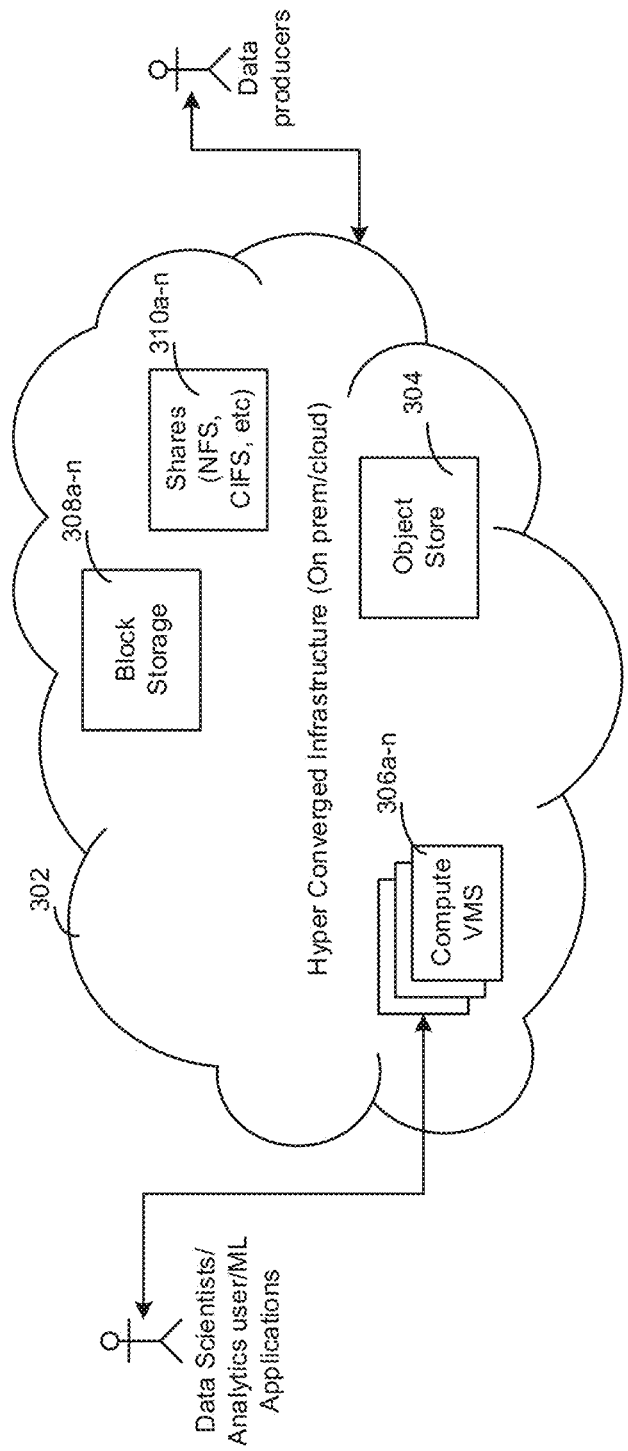
FIG. 3 illustrates a hyper converged infrastructure (HCI), in accordance with some embodiments of the present disclosure.

FIG. 3 illustrates a hyper converged infrastructure (HCI) 302, in accordance with some embodiments of the present disclosure. The HCI 302 includes an object store 304, compute virtual machines (VMs) 306a-n, and storage resources, e.g., block storage 308a-n and file storage/shares 310a-n such as a network file system (NFS), a common internet file system (CIFS), etc. Via the HCI 302, processing is brought closer to the data than via the object store system 202. The data can be stored by producers and a query or a search can be run on the data by analysts (e.g., analysts or data scientists). In some embodiments, the data retrieved from the locally hosted drives is pulled into a VM or container by the application and then the data is processed. Thus, a difference between the traditional object store 202 and the object store 304 of the HCI 302 is the colocation of data. However, in some embodiments with respect to FIG. 3, the processing is triggered by the user, application, or event and, responsive to the trigger, scheduled based on resource availability. In some embodiments, when there are limited resources, then other strategies are employed (scaling if possible, prioritizing if possible based on scheduling algorithms like cost-based, priority based, energy efficiency etc.).

Figure 4:
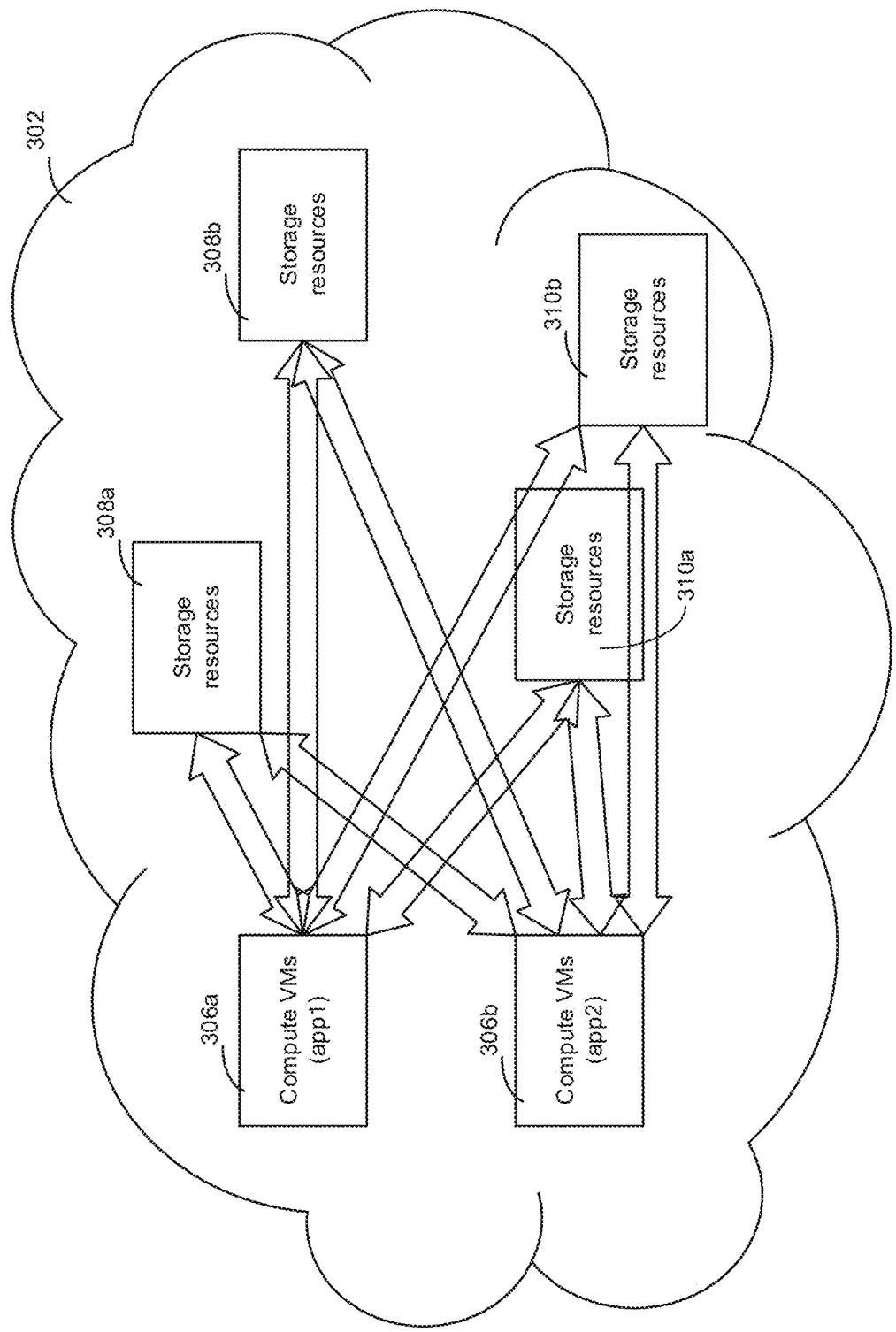
FIG. 4 illustrates the HCI, in accordance with some embodiments of the present disclosure.

FIG. 4 illustrates the HCI 302, in accordance with some embodiments of the present disclosure. As a cluster or region grows in size with multiple tenants/application each trying to process their own data, in some embodiments, the data sometimes ping pongs, or network hops, between various resources (e.g., the compute VMs 304a-n and the storage resources such as the block storage resources 308a-n and the file storage resources 310a-n).

Figure 5:
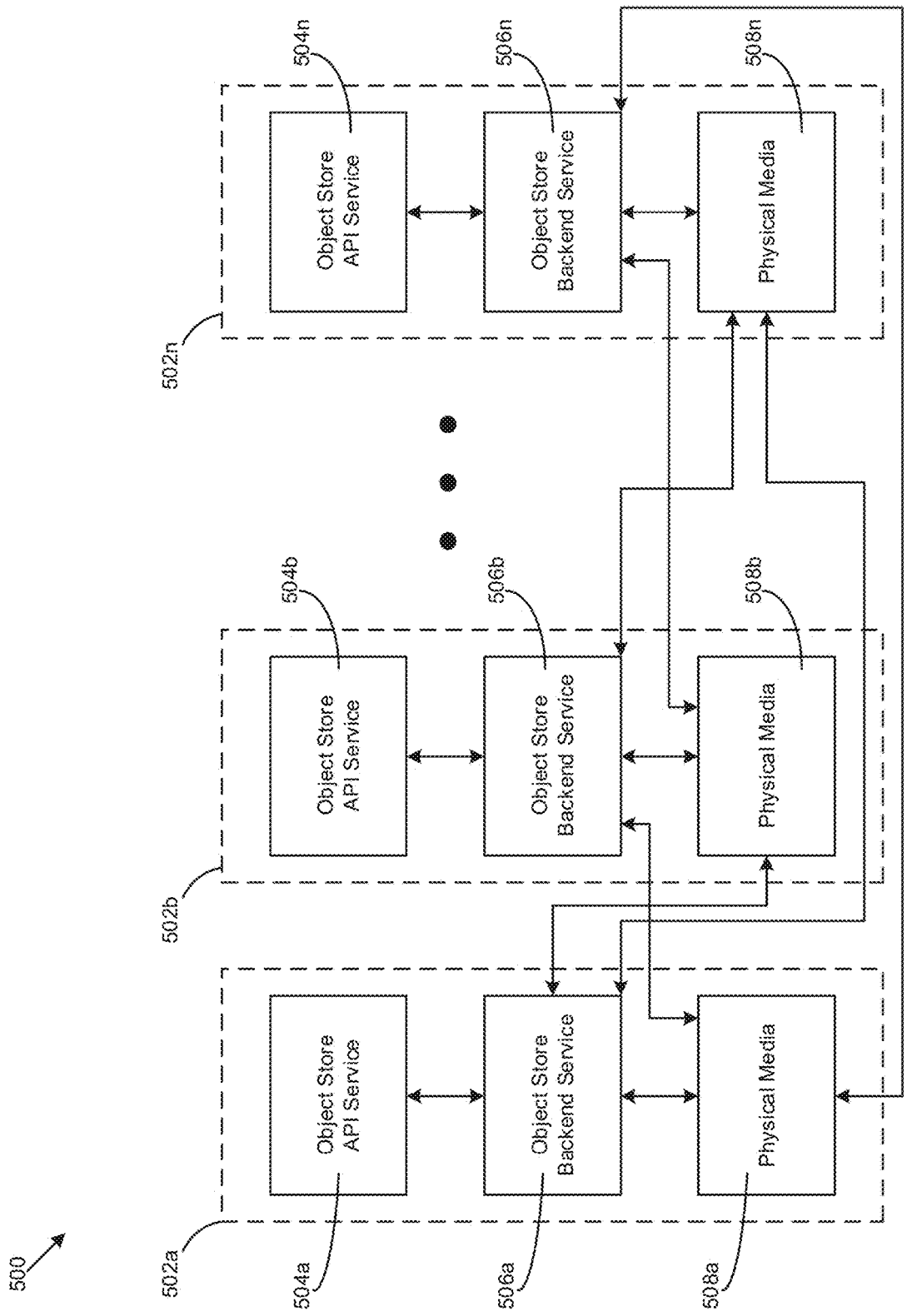
FIG. 5 illustrates an HCI, in accordance with some embodiments of the present disclosure.

FIG. 5 illustrates an HCI 500, in accordance with some embodiments of the present disclosure. In some embodiments, the network hopping is exacerbated in the case of an object store such as the object store 304. The HCI 500 includes physical nodes 502a-n. (generally, physical node 502) Each physical node 502 includes an object store API service 504, an object store backend service 506, and physical media 508 (e.g., the physical node 502a includes an object store API service 504a, an object store backend service 506a, and physical media 508a, the physical node 502b includes an object store API service 504a, an object store backend service 506a, and an physical media 508a, and the physical node 502n includes an object store API service 504n, an object store backend service 506n, and physical media 508n). In some embodiments, the HCI 500 is an instance of the HCI 302. In some embodiments, the object store 304 includes the object store API service 504 and the object store backend service 506. In some embodiments, the physical media 508 includes the block storage 306 and the file storage 308.

The request can arrive at any store (e.g., at the object store API service 504a) and since most object storage systems shard or chunk the data before storing (for implementation, dedupe, compression, erasure coding, etc.), the data (e.g., a single large object) can end up being on multiple physical nodes (e.g., the physical nodes 502a-n). In some embodiments, the object store solution is expected to scale to several petabytes or exabytes. Thus, in some embodiments, to aggregate the data or the object (e.g., to get the data to one location) may involve several network hops and look ups, costing latency. Further, if the data has to be pulled into a serverless compute, then there would be one or more extra hops. Finally, the user has to manage and deal with two constructs (the object store and the compute).

Consider an example of video processing. The video from cameras or other devices can be fed into object store system and the data processing application can perform face recognition. In some embodiments, the objects are uploaded in parts, e.g., a 20 GB mpeg image is uploaded as 100 MB parts and single 20 GB object is constructed from the part uploads. Each of these 100 MB parts could end up on any of the physical nodes 502a-n in the cluster. For example, there are 20 physical nodes in the cluster and each physical node gets, e.g., 1 GB (or 10 such parts). In some embodiments with respect to FIG. 5, a data processing application that is trying to get some information from this 20 GB object downloads the entire object to a single physical node (e.g., the physical node 502a) and processes it (e.g., the application that is being developed is tasked with recognizing the people in the video and get a picture of face of the people in the video and save it as a jpeg file in a separate object). In the case of the HCI 500 implementing the object store, in some embodiments, such aggregation before processing may result in additional usage of available bandwidth/throughput, increase of latency, and additional network hops.

Figure 6:
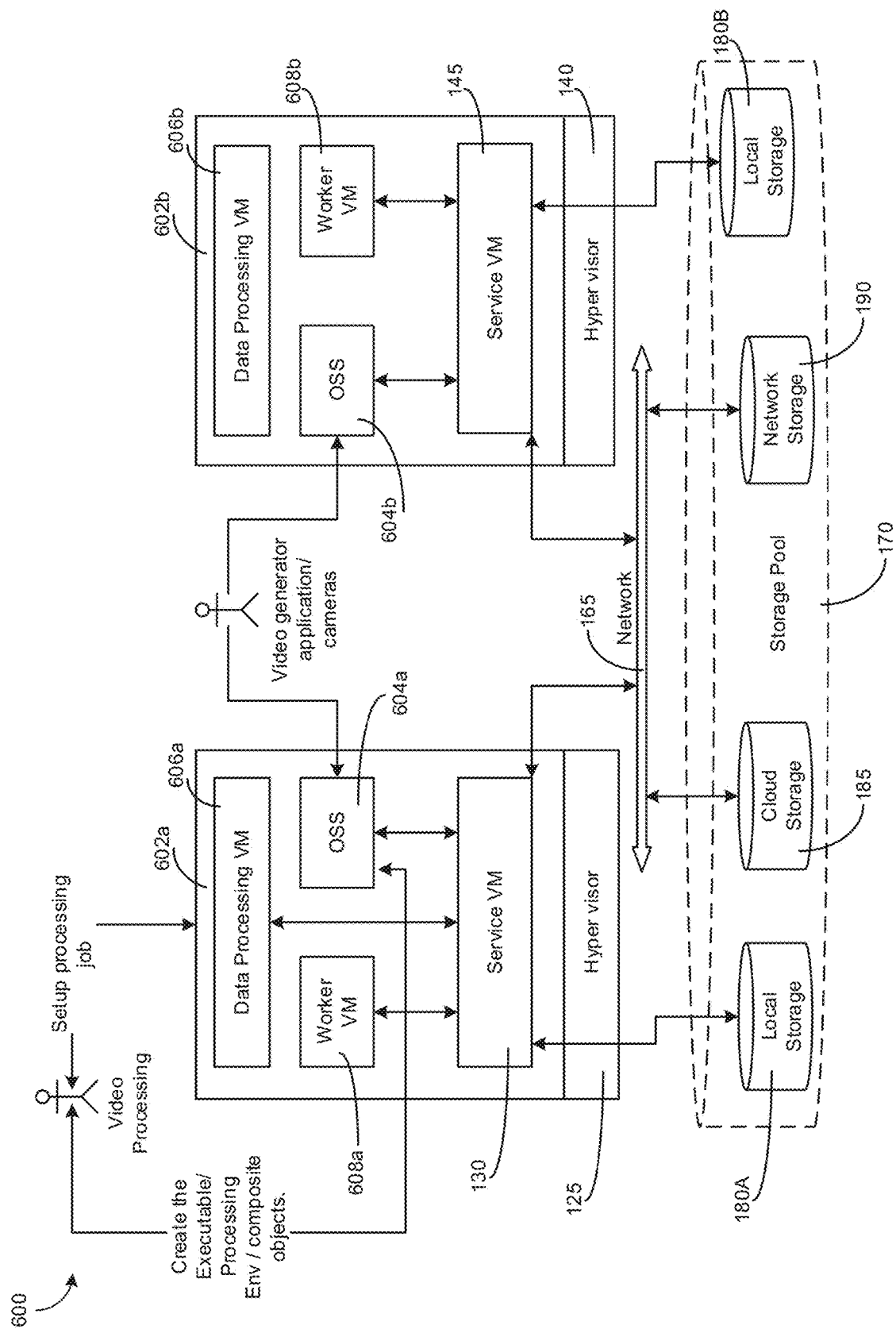
FIG. 6 Illustrates an HCI, in accordance with some embodiments of the present disclosure.

FIG. 6 Illustrates an HCI 600, in accordance with some embodiments of the present disclosure. The HCI 600 includes a node 602a, a node 602b (generally, node 602), a storage pool 170, and a network 165 coupling the node 602a, the node 602b, and the storage pool 170 to each other. Each node 602 includes an object storage system (OSS) 604, a data processing VM 606, a worker VM 608, a controller/service VM, a hypervisor, and local storage (e.g., the node 602a includes an OSS 604a, a data processing VM 606a, a worker VM 608a, the controller/service VM 130, the hypervisor 125, and the local storage 180A, and the node 602b includes an OSS 604b, a data processing VM 606b, a worker VM 608b, the controller/service VM 145, the hypervisor 140, and the local storage 180B). The storage pool 170 includes the local storage 180A, the local storage 180B, the cloud storage 185, and the network storage 190. In some embodiments, the nodes 602a-b are instances of the nodes 105 and 110, respectively, with respect to FIG. 1. In some embodiments, the object storage systems 604a-b, the data processing VMs 606a-b, and/or the worker VMs 608a-b are instances of user VMs (e.g., the user VMs 120A-B and the user VMs 135A-B) with respect to FIG. 1. In some embodiments, the HCI 600 includes N nodes. In some embodiments, the HCI 600 includes components or aspects of the HCI 302 and/or the HCI 500.

Data (e.g., video) is input to an OSS 604 (e.g., the OSS 604a) through an object store service (which is a distributed service running within or on top of the HCI 600) using representational state transfer (REST) application programming interface (API) or a custom object store API implementation using C++, Java, Python or GO interface. In some embodiments, one or more OSSs 604 run, execute, or otherwise include the object store service. The data can be ingested to specific container or container-like bucket within the OSS 604 or to some policy. The container or container-like bucket is, in some embodiments, a virtual representation of the storage pool 170, or a portion thereof. Independently, the analytics or data processing users can develop and deploy executable objects (binaries) and processing environments to a same or different bucket of the OSS 604 using an OSS API. Once all the objects are deployed the processing user can create composite objects and specify the bucket as an input in the data processing job submitted to a compute VM such as the Data Processing VM 606 (e.g., the data processing VM 606a) or a serverless compute implementation. The data processing VM 606 can schedule and run the job. When the actual job is run, the 100 MB parts can be pulled into a compute VM such as the local worker VM 608 (e.g., the local worker VM 608a) or any suitable VM with available resources and processed locally. The data processing VM 606 may in some cases pull in multiple such 100 MB jobs and run the processing on single or multiple such parts. The way the data is pulled into each worker VMs 608 can further be optimized by the underlying data store logic.

Each of the entities of the HCI 600 (e.g., the nodes 602a-b, the OSS 604a-b, the data processing VMs 606a-b, the worker VMs 608a-b, or a combination thereof) is an apparatus, in some embodiments. The apparatus includes one or more processors (e.g., the processing unit 192A, 192B, or 192C). The one or more processors are hardware or a combination of hardware and software, in some embodiments. The one or more processors have programmed instructions that, upon being executed, causes the apparatus to perform operations (e.g., read, write, send, receive, identify, determine, calculate, and the like). The programmed instructions are stored on non-transitory storage media (e.g., the storage pool 170), in some embodiments.

In some embodiments, responsive to an upload request of a user (e.g., a user, a user application, a client, another service, application, processor, or device, etc.) using an API request such as an object PUT request, the OSS 604 uploads (e.g., specifies, writes, creates), an object or an object key (e.g., metadata, pointer, name, identifier, location, etc.) and, in some embodiments, specifies an object type. For example, a first object (e.g., a video object that includes 20 GB of video data, see "ok_d" in appendix) is saved as 100 MB parts, or keys thereof, and the 20 GB object is named, video_camera_1_Aug_1.mpeg. The object PUT may not specify any special headers. In some embodiments, a second object or an object key (e.g., processing code such as OpenCV C++, see "ok_x" in appendix) is uploaded and saved as a separate object or object key (e.g., in a same or different bucket) and is called OpenCV.int. The second object PUT may have special header like exec-obj and the value may be set to true. In some embodiments, a third object or an object key (e.g., processing environment such as CentOS based VM image or container image with necessary OpenCV and Boost libraries to run the binary in the second object, see "ok_i" in appendix) is saved a separate object or object key (e.g., in a same or different bucket) and is called ProcessingEnv.int. The third object PUT may have special header like exec-env-obj and the value may be set to true. Each object or object key is referred to herein as an object, for sake of brevity.

In some embodiments, responsive to interactions with the user, the OSS 604 creates (e.g., constructs, generates) a composite object (see "ok_c" in the appendix). In some embodiments, the composite object is not a executable object and/or includes only non-executable objects ("normal composite object"). In some embodiments, the composite object is an executable object and/or includes one or more executable objects ("executable composite object"). For example, a composite object, process_video_camera_1_Aug_1.job is created. The composite object can include the video, processing code and processing environment (and is, thus, an executable composite object). A new bucket for the composite object may be created. An entry in the bucket, a metadata service of the OSS 604, a memory, a database, or other construct may be made (e.g., made created, generated, added, etc.) for the composite object which specifies that the composite object is under the new bucket. For example, the OSS 604 (e.g., a processor thereon) executes the command "C=OpenCompositeObject(b_c, ok_c)" to create a bucket b_c and a composite object ok_c in the bucket b_c. The data objects, executable object, and environment object are written to the composite object. For example, the OSS 604 executes "C.put(b_d, ok_d)" to write ok_d to ok_d, "C.put(b_i, ok_i, exec=true)" to write ok_i to ok_c, and "C.put(b_x, ok_x, exec_env=true)" to write ok_x to ok_c. In some embodiments, the data object includes multiple data objects (e.g., multiple parts), and the multiple data objects are written separately. For example, the OSS 604 executes "pl=GetParts(ok_d, b_d)" to read ok_d as multiple parts and "for i=1 to |pl| do C.put(b_d, pl[i]); end" to write each of the multiple parts to ok_d. In some embodiments, the entry is made even though the composite object may not be complete. The composite object is closed. For example, the OSS 604 executes "C.close( )." In some embodiments, a close/finalize process triggers processing (e.g., scanning, executing) to be done on the composite object. The composite object can be in a different bucket (e.g., processing_bucket.int) or database entry.

Figure 7:
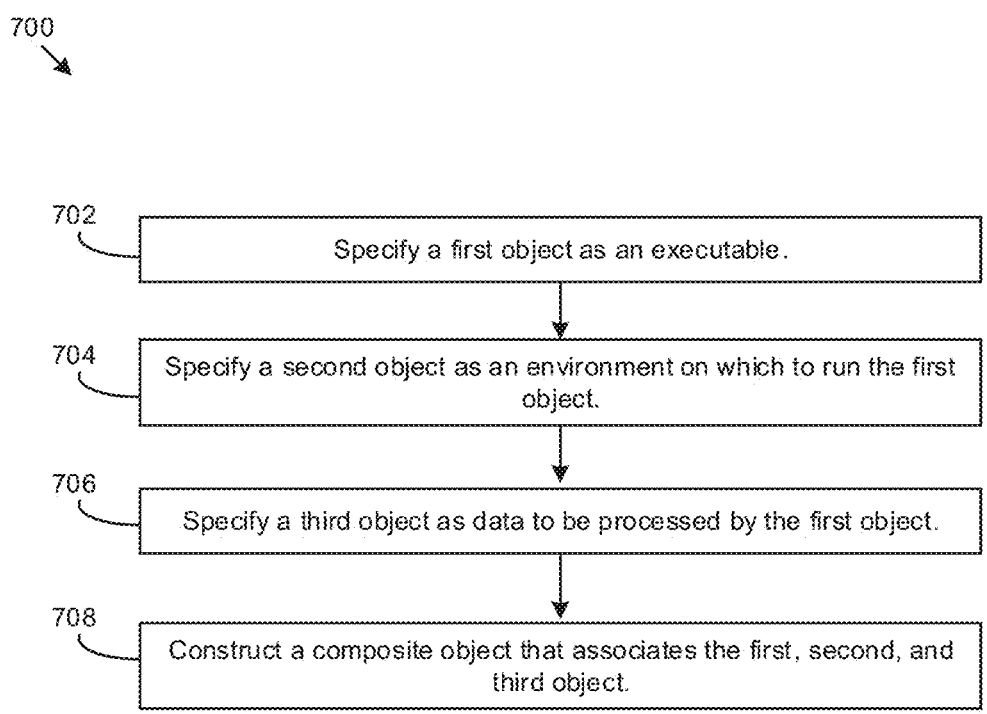
FIG. 7 is an example method for constructing a composite object, in accordance with some embodiments of the present disclosure.

Referring now to FIG. 7, an example method 700 for constructing a composite object is shown, in accordance with some embodiments of the present disclosure. The method 700 may be implemented using, or performed by, one or more of the components of the HCI 600, which is detailed herein with respect to FIG. 6. The method 700 may be implemented using, or performed by, one or more of the OSSs 604*a-b*, an application or service of the one or more of the OSSs 604*a-b*, and/or a processor (e.g., executing the application or service) associated with one or more of the OSSs 604*a-b*. Additional, fewer, or different operations may be performed in the method 700 depending on the embodiment. In some embodiments, the method 700 is a stand-alone method, while in other embodiments, the method 700 is part of a larger method including the method 800, the method 900, and/or the method 1000.

A processor, such as a processor associated with the OSS 604*a* or other component of the HCI 600, specifies a first object as an executable (702). The processor specifies a second object as an environment (e.g., an executable environment) on which to run the first object (e.g., the executable) (704). The processor specifies a third object as data to be processed by the first object (706). In some embodiments, each of the first, second, and third objects includes, or is associated with, an object key. In some embodiments, each of the first, second, and third objects and/or each object key is stored in respective buckets.

The processor constructs a composite object that includes and/or associates the first, second, and third objects (708). In some embodiments, the processor constructs the composite object by writing each of the objects to the composite object. In some embodiments, the processor constructs the composite object by writing the object keys associated with each of the objects to the composite object. Each object key can identify the respective object and the location thereof. In some embodiments, the processor stores the composite object in a bucket separate from the buckets of the first three objects.

Figure 8:
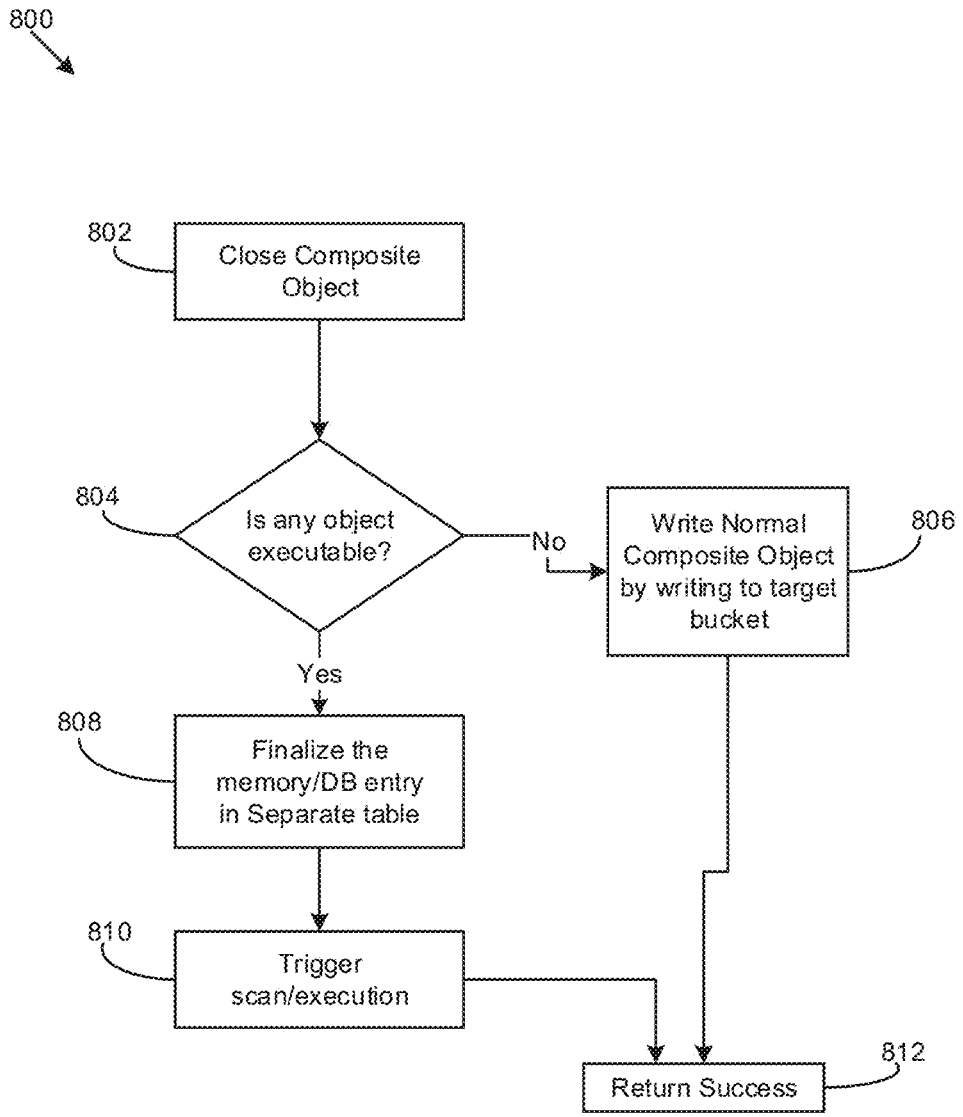
FIG. 8 is an example method for processing a CLOSE request of a composite object, in accordance with some embodiments of the present disclosure.

Referring now to FIG. 8, an example method 800 for processing a CLOSE request of a composite object is shown, in accordance with some embodiments of the present disclosure. The method 800 may be implemented using, or performed by, one or more of the components of the HCI 600, which is detailed herein with respect to FIG. 6. The method 800 may be implemented using, or performed by, one or more of the OSSs 604*a-b*, an application or service of the one or more of the OSSs 604*a-b*, and/or a processor (e.g., executing the application or service) associated with one or more of the OSSs 604*a-b*. Additional, fewer, or different operations may be performed in the method 800 depending on the embodiment. In some embodiments, the method 800 is a stand-alone method, while in other embodiments, the method 800 is part of a larger method including the method 700, the method 900, and/or the method 1000.

A processor, such as a processor associated with the OSS 604*a* or other component of the HCI 600, executes a CLOSE command. The close command can be received, from a user (e.g., a user, a processing user, a user application, a client, another service, application, processor, or device, etc.), a request (e.g., request/call/action/operation) to CLOSE a composite object (802). The processor determines whether any object (e.g. in the composite object) is executable (804). If the processor determines that none of the objects are executable, the processor writes a normal composite object (806). In some embodiments, if the processor determines that none of the objects are executable, the processor writes to target bucket. If the processor determines that one or more of the objects are executable, the processor closes/finalizes the composite object and/or the entry (e.g., a database entry or a memory entry) associated with the composite object (808). In some embodiments, if the processor determines that one or more of the objects are executable, the processor writes (e.g., stores, generates, creates, puts, fills, finalizes, completes, etc.), in a separate data structure (e.g., persistent store, table, database table, memory, bucket) dedicated to executable objects, an entry (e.g., the completed entry, the contents of the entry, the composite object, data entry, metadata entry) corresponding to the data or the metadata of the composite object. In some embodiments, two databases are written to: a) a database for data of the composite object, and b) a database for metadata of the composite object. In some embodiments, if the processor writes the composite object to a persistent store (e.g., one of the storage components in the storage pool 170 of FIG. 1), and if the HCI 600 restarts (e.g., powers down and powers up), the processor can perform a map-reduce of a database including the composite object stored in the persistent store. In some embodiments, the processor triggers a scan or an execution (810). In some embodiments, the scan and/or execution is performed on the metadata database/entries. After performing step 806 or 810 (or, in some embodiments, 808), the processor sends a success (e.g., a success, an acknowledgement a response/output indicating success, etc.), as an output/response to the CLOSE action/request, to the user (812).

In some embodiments, once the CLOSE action is called on the composite object, the user gets a success on successful CLOSE, but the object is not immediately available or processed for consumption. In some embodiments, during the interval the GET actions on the object result in an error or message. In some embodiments, once the processor CLOSEs the composite object, the completed entry is put in separate database table. In some embodiments, an existing object information table is reused. Alternatively or additionally, closing the composite object can trigger execution of the composite object (e.g., execution of a job).

Figure 9:
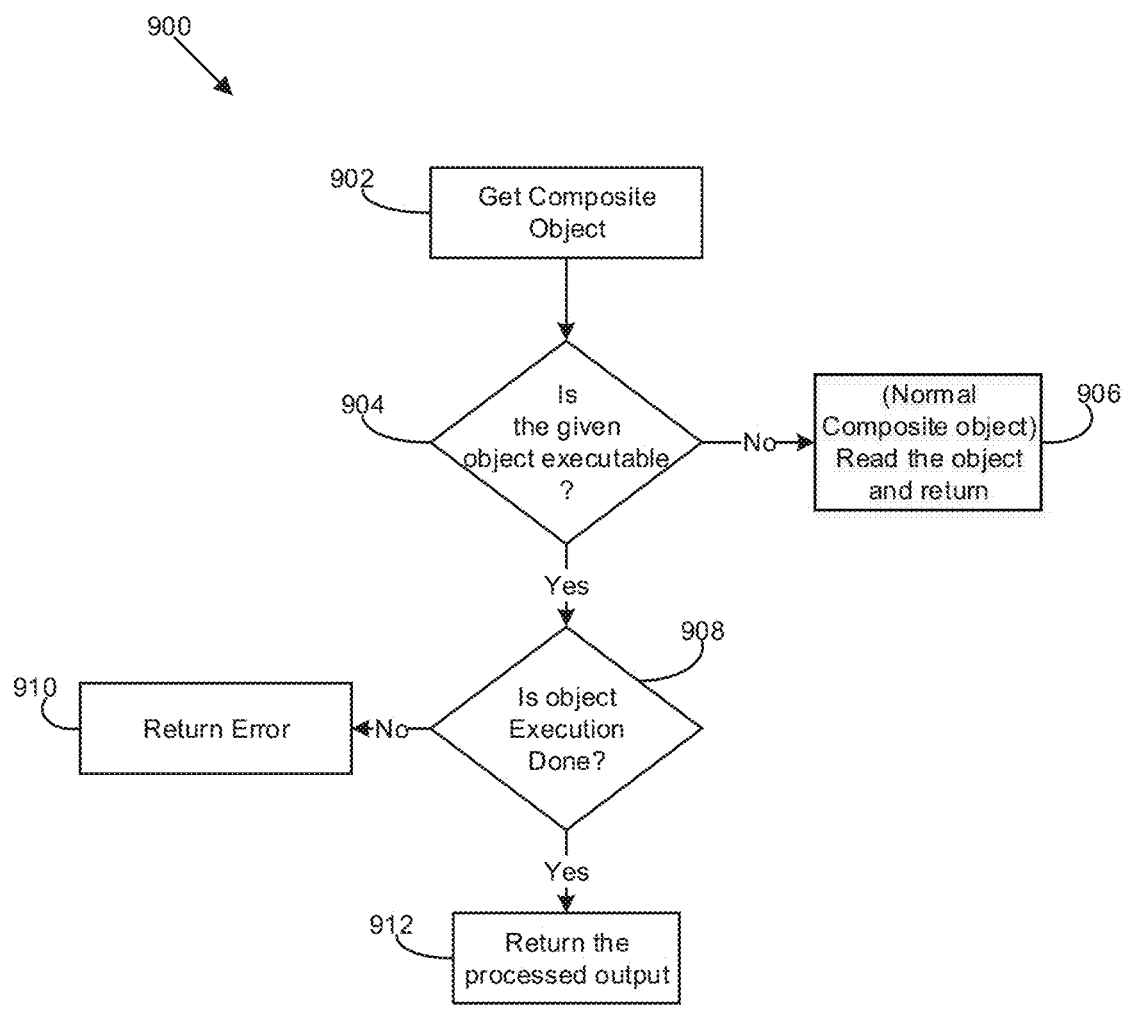
FIG. 9 is an example method for processing a GET request of a composite object, in accordance with some embodiments of the present disclosure.

Referring now to FIG. 9, an example method 900 for processing a GET request of an composite object is shown, in accordance with some embodiments of the present disclosure. The method 900 may be implemented using, or performed by, one or more of the components of the HCI 600, which is detailed herein with respect to FIG. 6. The method 900 may be implemented using, or performed by, one or more of the OSSs 604a-b, an application or service of the one or more of the OSSs 604a-b, and/or a processor (e.g., executing the application or service) associated with one or more of the OSSs 604a-b. Additional, fewer, or different operations may be performed in the method 900 depending on the embodiment. In some embodiments, the method 900 is a stand-alone method, while in other embodiments, the method 900 is part of a larger method including the method 700, the method 800, and/or the method 1000.

A processor, such as a processor associated with the OSS 604a or other component of the HCI 600, executes a GET command in response to receiving, from the user, a request to GET (e.g., read) the composite object (902). Once the executable object is executed, the composite object includes a processed output (see "ok_o" in appendix). The processor determines whether the composite object is, or includes, an executable object (904). If the processor determines that the composite object is not, or does not include, an executable object, the processor reads the object and returns an output to the user (906). If the processor determines that the composite object is an executable object, the processor determines whether object execution (e.g., job) is done/completed (908). If the processor determines that the object execution is not done, the processor returns an error to the user (910). If the processor determines that the object execution is done, the processor returns the processed output of the executable object to the user (912).

In some embodiments, the processed output of the executed job or end object is generated. Until the job is scheduled and run, reading the processed output may result in an error or incomplete message. The processed output or objects can be ephemeral, that is, once the process is executed and after the object is read once, the object is automatically deleted from the bucket.

After the composite object is closed, the data processing VM 606 or the OSS 604 can schedule a job. In some embodiments, the job scheduling is a background process which scans for and schedules the executable objects. In some embodiments, the composite object creation can create a task, e.g., in the foreground, that is executed on an available compute resource. The execution can work on the entire object (e.g., the 20 GB mpeg file) or execution can work on each of the separate objects (e.g., 1 GB files).

Figure 10:
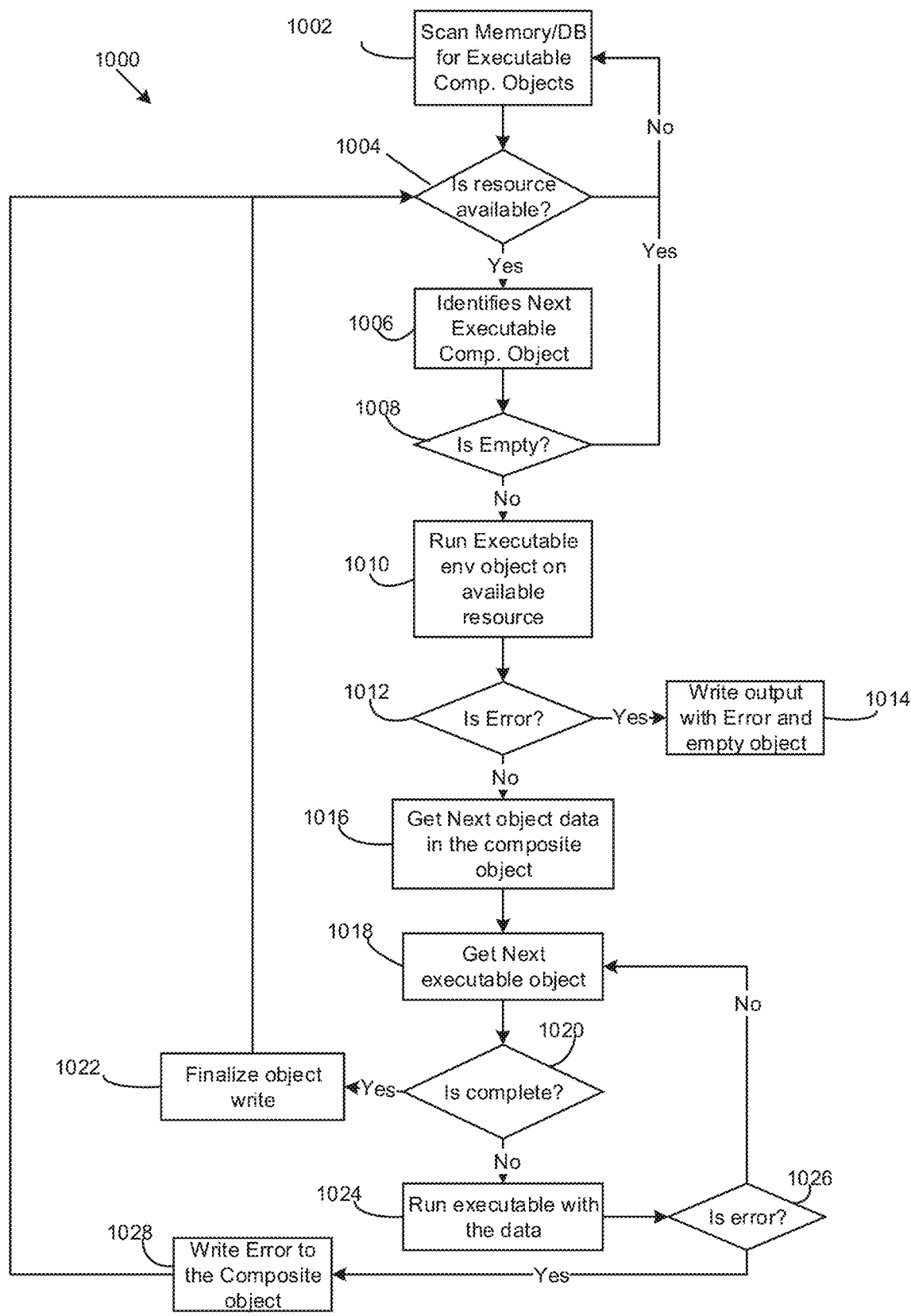
FIG. 10 is an example method for executing available composite object, in accordance with some embodiments of the present disclosure.

Referring now to FIG. 10, an example method 1000 for executing available composite object is shown, in accordance with some embodiments of the present disclosure. The method 1000 may be implemented using, or performed by, one or more of the components of the HCI 600, which is detailed herein with respect to FIG. 6. The method 1000 may be implemented using, or performed by, one or more of the OSSs 604a-b, an application or service of the one or more of the OSSs 604a-b, and/or a processor (e.g., executing the application or service) associated with one or more of the OSSs 604a-b. Additional, fewer, or different operations may be performed in the method 1000 depending on the embodiment. In some embodiments, the method 1000 is a stand-alone method, while in other embodiments, the method 1000 is part of a larger method including the method 700, the method 800, and/or the method 900.

A processor, such as a processor associated with the OSS 604a or other component of the HCI 600, scans database (e.g., separate/dedicated database/table/memory/bucket) to identify one or more executable composite objects (e.g., the metadata thereof) (1002). In some embodiments, the OSS 604a periodically scans the database table containing all available entries (e.g., executable composite objects) and takes up any available entries for execution. In some embodiments, a number of the scanned executable composite objects (e.g., available entries) may depend on a frequency of the scan and/or a speed of processing current objects in the database or queue. The processor determines whether a resource (e.g., a VM, container, cloud entity, processor, or any entity or device suitable for taking the data and processing it) is available (1004). If the processor determines the resource is not available, the method 1000 returns to 1002. In some embodiments, once the resource is available, the resource can be taken up (e.g., taken up, reserved, allocated, etc.) for processing a next executable composite object. If processor determines that the resource is available, the processor identifies (e.g., reads, reads an entry corresponding to, executes a GET command of, etc.) a next executable composite object from the one or more executable composite objects in the database (1006).

The processor determines whether the next executable composite object is empty (1008). In some embodiments, the next composite object is empty if the composite object does not include any objects. In some embodiments, the next executable composite object is empty if the only object contained within the composite object have been processed/executed. If the processor determines that the next composite object is an empty, the method 1000 returns to 1002. If the processor determines that the next composite object is not empty, the processor runs (e.g., launches, installs, executes, etc.) an executable environment (env) object, which is included in the executable composite object, on the available resource (1010). In some embodiments, the processor executes a GETExecEnv command to fetch the executable env object and run it to the resource.

The processor determines whether running the executable env object on the resource results in an error (1012). If the processor determines that there is an error, the processor writes an output with the error and empties the composite object (1014). If the processor determines that there is not an error, the processor reads (e.g., identifies, queues up, reads an entry corresponding to, executes a GET of) a next executable object in the next executable composite object (1016). The processor reads (e.g., reads an entry corresponding to, executes a GETExec of) a next executable object in the next executable composite object (1018).

The processor determines whether the next executable composite object is complete (e.g., whether all of the executable objects in the next executable composite object have been run/executed) (1020). If the processor determines that the next executable composite object is complete, the processor finalizes an object write, e.g., associated with the next composite object (1022) and the method 1000 returns to 1004. After executing/finalizing, the processor sends the processed data to the user. If the processor determines that the next executable composite object is not complete, the processor runs (e.g., executes ExecJob command) the next executable object with the next object data within the executable env running on the resource (1024).

The processor determines whether running the next executable object generates an error (e.g., whether a response of the ExecJob request includes an error) (1026). If the processor determines that running the next executable object does not generate the error, the method returns 1018. In some embodiments, each object data has multiple executable objects associated with it. For example, in the video file processing, on the same file, the OSS 604, or some other component of the HCI 600, can encode, decode, compress, etc. Each action (encoding, decoding, compressing, etc.) can generate a separate executable and each of the executables can be a separate executable object. In some embodiments, the multiple parts of a data object and/or multiple executables are on different nodes. In some embodiments, multiple parts of a data object and/or multiple executables can be distributed into multiple composite objects, and each of the multiple composite objects can run on a different available resource. In some embodiments, some or all nodes process parts of the data object and/or different composite objects of the multiple composite objects based on the resource availability and data locality. Executing a composite object in a distributed fashion leverages the distributive nature of OSS 604.

If the processor determines that running the next executable object generates the error, the processor writes the error to the next composite object (1028), and the method 1000 returns to 1004. During the execution, the next composite can fail, and, in some embodiments, the processor retains the entry. The execution of the next composite object corresponding to the entry can be retried on the next scan. The user or policy can set certain number of maximum retries before which fails permanently. The OSS 604 can determine that a number of retries associated with executing the first object is less than a maximum number of retries. The OSS 604 can retry based on the determination. In some embodiments, the OSS 604a deletes any un-processed (e.g., yet to be processed) composite objects, in response to a user or a policy.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Appendix

---
Algorithm 1: Creating a Composite Object for Single Object Processing.
--- input: ok_d: single large object key to be processed
b_d: bucket containing ok_d
ok_x: object containing the executable
b_x: bucket containing ok_x
ok_i: object containing the executable env
b_i: bucket containig ok_i
ok_c: object key for composite object
b_c: bucket for ok_c
1 pl = GetParts(ok_d, b_d)
2 C = OpenCompositeObject(b_c, ok_c);
3 C.put(b_i, ok_i, exec=true);
4 C.put(b_x, ok_x, exec_env=true);
3 for i = 1 to |pl| do
4 C.put(b_d, pl[i]);
5 end
6 C.close( )

---
Algorithm 2: Processing Composite Objects with Optimization Based on Object Chunks and Location.
--- input: ok_c: object key for composite object
b_c: bucket for ok_c
ok_o: object key for output object
b_o: bucket for ok_o
1 pl = GetDataParts(ok_c, b_c);
2 ok_i, b_i = GetExecEnv(ok_i, b_i);
3 ok_x, b_x = GetExec(ok_c, b_c);
4 Lk = { }; // Location Map of data parts
5 for i = 1 to |pl| do
6 Lk[i] = GetLocation(b_d, pl[i]); //Get part location
7 end
8 LB = GetBestLocation(Lk); // Batch parts based on their Location and return map
9 while |LB| > 0 do
10 ExecJob(LB[i], ok_x, b_x, ok_i, b_i, ok_o, b_o);
11 remove LB[i] from LB on successful run;
12 end

What is claimed:

1. An apparatus comprising a processor and a memory, wherein the memory includes programmed instructions that, when executed by the processor, cause the apparatus to:
store, based on a first request, an executable object in a first node of an object store, wherein the object store is included in a hyperconverged infrastructure, the hyperconverged infrastructure comprising the first node and a second node;
store, based on the first request, an environment object in the first node of the object store;
store, based on a second request, a first shard of a data object in the first node of the object store, wherein a second shard of the data object is stored on a second node of the object store, wherein the data object is a video object; and
construct a composite object that includes the executable object, the environment object, and the first shard of the data object,
wherein a compute resource on the first node accesses the composite object and separately processes the first shard of the data object, using the executable object and the environment object.

2. The apparatus of claim 1, wherein the memory further includes the programmed instructions that, when executed by the processor, further cause the apparatus to store the composite object in a bucket.

3. The apparatus of claim 1, wherein the memory further includes the programmed instructions that, when executed by the processor, further cause the apparatus to:
write the composite object to a database; and
scan the database for the composite object.

4. The apparatus of claim 1, wherein the memory further includes the programmed instructions that, when executed by the processor, further cause the apparatus to run the environment object on an available resource.

5. The apparatus of claim 1, wherein the memory further includes the programmed instructions that, when executed by the processor, further cause the apparatus to execute, on the environment object, the executable object with the first shard of the data object as an input to the executable object.

6. The apparatus of claim 5, wherein the memory further includes the programmed instructions that, when executed by the processor, further cause the apparatus to:
determine that a number of retries associated with executing the executable object is less than a maximum number of retries; and
retry executing the executable object based on the determination.

7. The apparatus of claim 1, wherein the memory further includes the programmed instructions that, when executed by the processor, further cause the apparatus to:
close the composite object; and
trigger at least one of a scan of a database including the composite object and execution of the composite object.

8. The apparatus of claim 1, wherein each of the executable object, the environment object and the data object includes an object key.

9. A non-transitory computer readable storage medium comprising instructions stored thereon that, when executed by a processor, cause the processor to:
store, based on a first request, an executable object in a first node of an object store;
store, based on the first request, an environment object in the first node of the object store;
store, based on a second request, a first shard of a data object in the first node of the object store, wherein a second shard of the data object is stored on a second node of the object store, wherein the data object is a video object; and
construct a composite object that includes the executable object, the environment object, and the first shard of the data object,
wherein a compute resource on the first node accesses the composite object and separately processes the first shard of the data object, using the executable object and the environment object.

10. The storage medium of claim 9, comprising the instructions stored thereon that, when executed by the processor, further cause the processor to store the composite object in a bucket.

11. The storage medium of claim 9, comprising the instructions stored thereon that, when executed by the processor, further cause the processor to:
write the composite object to a database; and
scan the database for the composite object.

12. The storage medium of claim 9, comprising the instructions stored thereon that, when executed by the processor, further cause the processor to run the environment object on an available resource.

13. The storage medium of claim 9, comprising the instructions stored thereon that, when executed by the processor, further cause the processor to execute, on the environment object, the executable object with the first shard of the data object as an input to the executable object.

14. The storage medium of claim 13, comprising the instructions stored thereon that, when executed by the processor, further cause the processor to:
determine that a number of retries associated with executing the executable object is less than a maximum number of retries; and
retry executing the executable object based on the determination.

15. The storage medium of claim 9, comprising the instructions stored thereon that, when executed by the processor, further cause the processor to:
close the composite object; and
trigger at least one of a scan of a database including the composite object and execution of the composite object.

16. The storage medium of claim 9, wherein each of the executable object, the environment object and the data object includes an object key.

17. A computer-implemented method comprising:
storing, based on a first request, an executable object in a first node of an object store, wherein the object store is included in a hyperconverged infrastructure, the hyperconverged infrastructure comprising the first node and a second node;
storing, based on the first request, an environment object in the first node of the object store;
storing, based on a second request, a first shard of a data object in the first node of the object store, wherein a second shard of the data object is stored on a second node of the object store, wherein the data object is a video object; and
constructing a composite object that includes the executable object, the environment object, and the first shard of the data object,
wherein a compute resource on the first node accesses the composite object and separately processes the first shard of the data object, using the executable object and the environment.

18. The method of claim 17, further comprising storing the composite object in a bucket.

19. The method of claim 17, further comprising:
writing the composite object to a database; and
scanning the database for the composite object.

20. The method of claim 17, further comprising running the environment object on an available resource.

21. The method of claim 17, further comprising executing, on the environment object, the executable object with the first shard of the data object as an input to the executable object.

22. The method of claim 21, further comprising:
determining that a number of retries associated with executing the executable object is less than a maximum number of retries; and
retrying executing the executable object based on the determination.

23. The method of claim 17, further comprising:
closing the composite object; and
triggering at least one of a scan of a database including the composite object and execution of the composite object.

24. The method of claim 17, wherein each of the executable object, the environment object and the data object includes an object key.

* * * * *